Nov. 10, 1959  F. W. HANKS  2,911,827
FLUID METER

Filed Feb. 17, 1955  2 Sheets-Sheet 1

INVENTOR.
FREDERICK W. HANKS
BY
Oberlin & Limbach
ATTORNEYS.

INVENTOR.
FREDERICK W. HANKS
BY
Oberlin & Limbach
ATTORNEYS.

United States Patent Office 2,911,827
Patented Nov. 10, 1959

2,911,827
FLUID METER
Frederick W. Hanks, Cleveland, Ohio
Application February 17, 1955, Serial No. 488,798
1 Claim. (Cl. 73—262)

The present invention, relating as indicated to fluid meters, has more particular regard to meters employed in the measurement of a flowing liquid, such for example, as a water meter.

As is well known, the measuring element in the conventional water meter is in the form of a nutating piston, which because of the considerable extent of peripheral contact with the chamber in which it is housed is subject to more or less rapid wear. Furthermore, due to the eccentric character of its rotative movement, such piston has a pulsating action, which frequently produces the pounding familiarly associated with meters of this type.

The object of the present invention is to provide a fluid meter in which the element that is actuated by the passage of fluid therethrough has a simple rotative movement. A further object is to provide a meter in which the flow of liquid will be substantially continuous, while at the same time the volume thereof will be accurately measured. Still a further object is to provide a meter which may be readily assembled or disassembled, thus facilitating the inspection and replacement of parts that may become worn.

To the accomplishment of the foregoing and related ends, said invention, then, consists of the means hereinafter fully described and particularly pointed out in the claim.

The annexed drawings and the following description set forth in detail certain mechanism embodying the invention, such disclosed means constituting, however, but one of various mechanical forms in which the principle of the invention may be used.

Figure 1:
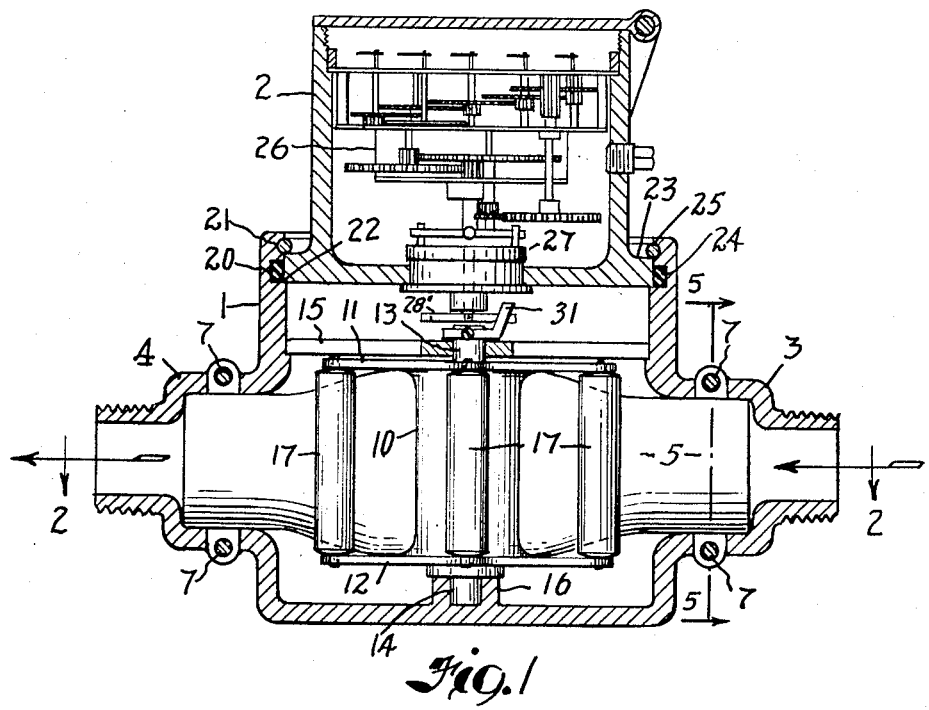
Fig. 1 is a central vertical section through a meter embodying my present improvements.

The main body of the meter, as illustrated in each of the several figures of the drawings, consists of a casing 1 of general cylindrical form, one face thereof, the upper as shown in Fig. 1, being open to receive a register-containing chamber 2 as will be presently described. Projecting in opposite directions from the side, i.e. cylindrical wall, of casing 1, are two hollow bosses 3 and 4 which respectively provide inlet and outlet openings for the fluid to be measured. The outer sections of these bosses will ordinarily be threaded as shown for the purpose of connecting therewith the piping through which the water or other fluid to be measured is being supplied.

Located within such casing is a flexible tube 5, the ends of which respectively enter the openings in bosses 3 and 4 and are there sealed in place. Such tube may be made of a suitable rubber compound, either natural or synthetic, or of an equivalent composition which will not be affected by the fluid to be metered, and which will stand up under the repeated compression and expansion action to which it is subjected in the operation of the meter, as will presently appear. I may state that I have found rubber compounds available which give satisfactory performance for an indefinite period in the metering of water.

In order to secure the ends of tube 5 in the openings in bosses 3 and 4, a stiffening ring 6 of proper external diameter is inserted in each such end so that when the latter are in turn inserted in the corresponding openings they will be forced into sealing contact therewith. In order to insure against endwise displacement of the tube ends when thus fitted into the openings, the bosses for the latter may be formed with removable sections 3a and 4a. The latter are semi-circular in extent so as to constitute in effect one-half of a split ring, the other half being provided by the remaining portion of the boss, to which such sections are attached by means of bolts or set screws 7. It will be understood, of course, that other suitable means may be utilized thus to connect the ends of the tube in firm, sealed relation in the openings in the casing.

Figure 2:
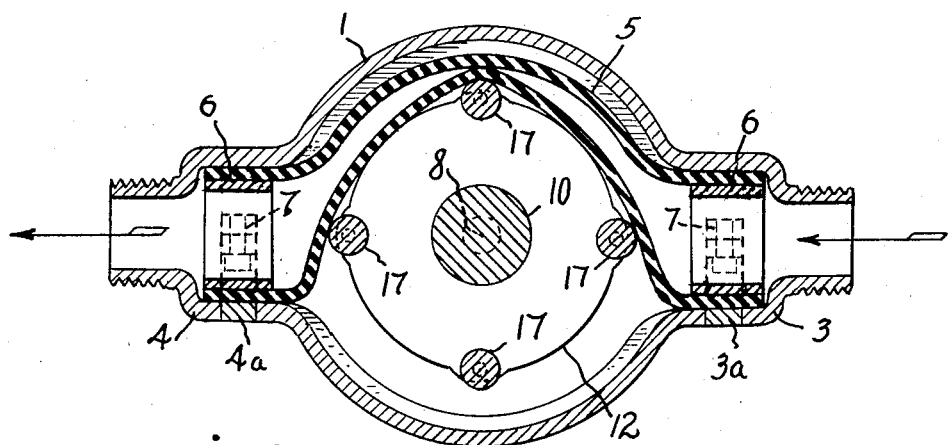
Fig. 2 is a horizontal section thereof taken on the plane indicated by the line 2—2, Fig. 1.

The portion of flexible tube 5 which lies within the casing 1 is of such length as to permit it to lie in contact with the portion of the side wall of casing 1 located between the inlet and outlet openings thereof. As shown in Fig. 2, such wall is so formed and disposed as to support the tube in approximately arcuate relation to an axis 8 in the casing, which is the axis of rotation of the member now to be described.

In the form shown in Figs. 1 and 2, said rotatable member is of spool shape, having a central hub 10 provided with disk-like extensions 11 and 12 at its ends. For the purpose of rotation, the hub is also provided with axial studs 13 and 14, the first of which is journalled in a suitable bearing provided in a spider 15 located in the upper portion of casing 1, and the second of which is stepped into a bearing 16 formed in the lower end wall of the casing.

Rotatively mounted between the disk-like ends 11 and 12 of the rotatable member are rollers 17 shown as four in number, such rollers being equi-distantly spaced circumferentially of said rotatable member and projecting radially therebeyond so as to be adapted upon rotation of said member successively to engage the flexible tube 5 adjacent the inlet opening of the casing and continue in such engagement until approximately the outlet opening is reached. The effect of such engagement will be to press the tube against the adjacent casing wall, and thereby seal it off along the line or area of compression. When this occurs the pressure of the liquid entering through the inlet opening will tend to expand the tube on the near side of the engaging roller, and as a result the latter will be pushed to the further end of the arcuately disposed portion of the tube, as the roller continues in its circular path of travel. In the meantime the next succeeding roller will have been brought into engagement in similar fashion with the tube adjacent the inlet end thereof, and such operation will continue as long as liquid under pressure is supplied to the meter. Obviously the body of liquid in the tube lying between the lines or areas of contact of successive rollers with such tube will be moved through the latter in unison with the rotative movement of the rollers about the axis 8. In effect the liquid will flow through the tube in a continuous stream, save for the slight interruption that occurs where the rollers contact with the tube, and the pulsating and pounding characteristics of a meter with nutating piston are substantially eliminated.

As previously stated, the register-containing chamber 2 forms in effect a closure for the upper open face of casing 1. The inner wall of the latter, adjacent such opening, is formed with two contiguous inwardly opening circular recesses 20 and 21, and adjacent the lower end of the former with a shoulder 22. The lower face of the register-containing chamber 2 is formed with an outwardly directed flange 23 that is adapted to rest on such shoulder 22 and is of such vertical width as to extend across recess 20 to the bottom of recess 21. Located in recess 20 is a ring 24 of compressible material, e.g. rubber, of such cross-sectional area as to provide a seal for flange 23 when the latter is seated on shoulder 22. Similarly, fitted to recess 21 is a locking ring, e.g. a split expansible ring 25, which when properly placed engages the upper edge of said flange 23, and thereby serves to secure the chamber 2 in place.

For the purpose in hand it is deemed unnecessary to describe in detail the register mechanism 26, since this may be of any well known type, capable of recording the rotation of disk 27 which serves as the driving member of the mechanism either as to number of rotations or such number translated into figures representing volume.

Figure 6:
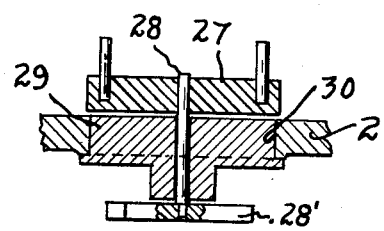
Fig. 6 is a section of a detail taken on the same vertical plane as that of Fig. 1 and showing the connection between the rotating element and the registering mechanism.

The connections between the rotatable member of the meter proper with said driving member of the register-mechanism is best shown in Fig. 6, from an inspection of which it will be seen that disk 27 is fixedly mounted as by press fitting onto spindle 28, which latter extends downwardly through, and is rotatably journalled in, a second disk member 29 tightly fitted in a central opening 30 therefor provided in the bottom wall of chamber 2. Accordingly, when chamber 2 is secured in place on casing 1, the lower end of spindle 28 will extend into the upper portion of casing 1, specifically into a space therein lying above spider 15. Secured to such lower end of spindle 28 is a spoked member 28' disposed so as to lie in the path of an upwardly bent finger 31 secured to the upper end of the stud 13 on the rotatable member in the meter proper. From the foregoing it will be seen that as said member rotates it will be effective through the connections just described to rotate in unison therewith the driving disk 27 of the register-mechanism. However, should it be desired to secure access to the interior of casing 1, it is only necesary to detach the register-containing chamber 2 by removing the locking ring 25. Thereupon spider 15, carrying with it the rotatable member, may be lifted directly out of the casing, leaving the tube 5 free to be removed by unclamping the respective ends thereof from the corresponding bosses 3 and 4 on the casing.

Figure 3:
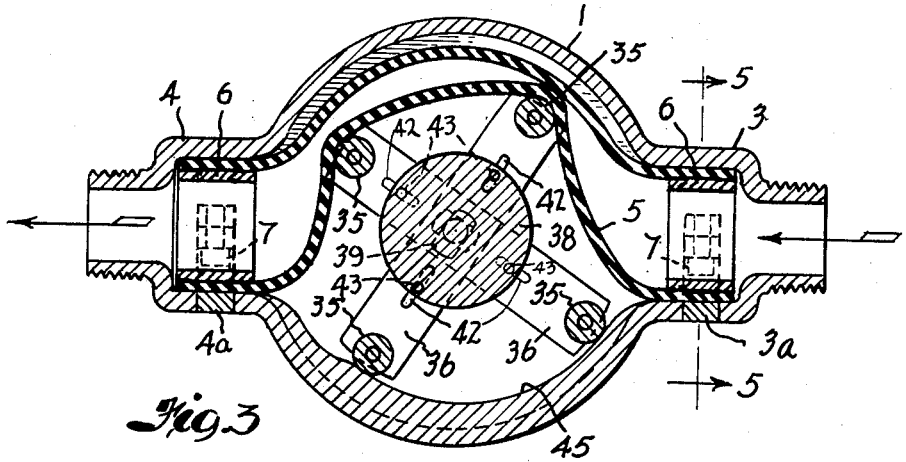
Fig. 3 is a horizontal section similar to that of Fig. 2 but showing a modification in construction.
Figure 4:
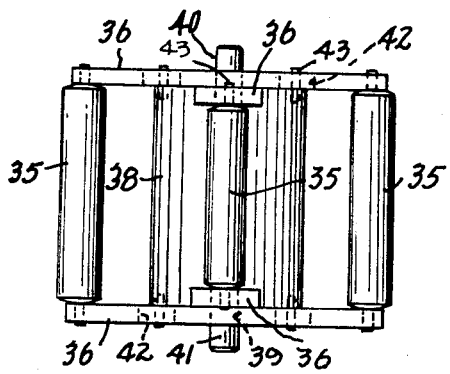
Fig. 4 is a side elevational view of the rotating element in such modified construction.
Figure 5:
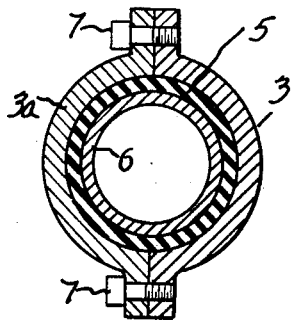
Fig. 5 is a transverse section taken on the plane indicated by the line 5—5 on Figs. 1 and 3.

The modified construction illustrated in Figs. 3 and 4 is in all respects similar to that shown in Figs. 1 and 2 and hereinbefore described, except for the manner in which the rollers, that constitute the tube-engaging projections on the rotatable member, are mounted on the latter. In such modified construction the rollers 35, instead of being mounted between disks that form the ends of a spool-like carrier, are mounted between pairs of diametrically extending members 36 that are reciprocably attached to the respective ends of a hub 38, corresponding with hub 10 of the first described construction, with one pair of members overlying the other and the hub ends being grooved to accommodate the inner pair. To permit such reciprocable attachment of members 36 to the hub, they are formed mid-way with longitudinally extending slots 39 of such width as to embrace the axially projecting studs 40 and 41 on the respective ends of the hub. Each of said members is further provided with a pair of narrower slots 42 lying on opposite sides of the slot 39 of the member but aligned therewith and disposed to engage pins 43 that project from the corresponding end of hub 38.

Where, as illustrated in Figs. 3 and 4, two pair, i.e. four rollers, are thus carried by the rotatable member, the arms 36 between which the respective pairs of rollers are mounted, will be disposed at right angles to each other. Accordingly, each pair of rollers may be independently reciprocated within the limits permitted by the slots 42.

The object is to effect such reciprocation in a radially outward direction of a roller as it is brought into initial contact with the flexible tube 5 adjacent the inlet end of such tube and then maintain such contact as the roller in question is moved along the arcuate wall of the casing against which it presses such tube. To this end a cam 45 in the form of a rib or enlargement of general arcuate contour is provided on the inner wall of the casing directly opposite the arcuate portion of the wall against which the tube requires to be pressed. By proper design of such cam surface any desired degree of pressure may be thus applied to the tube in order ot insure the closure thereof along the transverse lines or areas defined by the engaging roller. At the same time no strain is imposed on the bearings of the rotatable member, i.e. upon the oppositely projecting studs 40 and 41 on hub 38.

The operation of such modified construction, other than indicated, will be identical with that of the first described form of meter. Either embodiment, it will be seen, presents a number of features of improvement over conventional liquid meters. Particular notice is directed to the ease with which the register chamber may be separated from the casing of the meter proper and the complete accessibility of the parts located in the latter, including easy removability of the tubular member which is the only part of the meter that will ordinarily call for replacement, and that only at long intervals. Even in such case it is unnecessary to disconnect the meter from the piping through which the liquid to be metered is supplied.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:

In a fluid meter, a casing open at the top and having inlet and outlet openings in the side wall thereof, a tube made entirely of resiliently deformable material within said casing and arranged to be supported against a lateral wall section in arcuate relation to a vertical axis in the casing, connector means removably securing the ends of said tube respectively directly to the inlet and outlet openings so that the fluid flow through the meter is completley confined to the tube, a member rotatable about such axis, a plurality of diametrally extending and reciprocable carriers on said member, rollers supported at the ends of said carriers with their axes parallel to the axis of said member, a cam in the casing opposite the tube and positioned to be engaged by the rollers, each carrier being shifted by such roller engagement with the cam at one end to move the roller at the other end to engage the tube and press the same against the wall section supporting such tube, a register unit forming a removable closure for the top of said casing, and a driving connection between said member and said register unit.

References Cited in the file of this patent

UNITED STATES PATENTS

| | | |
|---|---|---|
| 40,195 | Smith | Oct. 6, 1863 |
| 87,837 | Gilmore | Mar. 16, 1869 |
| 271,257 | Morton | Jan. 30, 1883 |
| 312,106 | Fajen | Feb. 10, 1885 |
| 1,041,151 | Oberge | Oct. 15, 1912 |
| 1,662,382 | Fieldhouse | Mar. 13, 1928 |
| 2,153,061 | Hanks | Apr. 4, 1939 |
| 2,246,250 | Hanks | June 17, 1941 |
| 2,262,552 | Lyon | Nov. 11, 1941 |
| 2,286,411 | Hazard | June 16, 1942 |
| 2,409,688 | Moineau | Oct. 22, 1946 |
| 2,566,220 | Lindley et al. | Aug. 28, 1951 |
| 2,647,404 | Whitworth | Aug. 4, 1953 |
| 2,688,874 | Batchelder | Sept. 14, 1954 |